United States Patent [19]

Ueda

[11] Patent Number: 4,507,327

[45] Date of Patent: Mar. 26, 1985

[54] PROCESS FOR PREPARING EDIBLE PRODUCTS IN THE FORM OF CAPSULES

[75] Inventor: Tsunesuke Ueda, Hino, Japan

[73] Assignee: Q.P. Corporation, Tokyo, Japan

[21] Appl. No.: 497,197

[22] Filed: May 23, 1983

[51] Int. Cl.³ .............................. A23L 1/04; A23L 1/27
[52] U.S. Cl. ...................................... 426/276; 426/573; 426/577; 426/803; 426/250
[58] Field of Search ............... 426/577, 276, 803, 590, 426/102, 573, 250

[56] References Cited

U.S. PATENT DOCUMENTS 2,403,547  7/1946  Peschardt ............................ 426/803
4,117,172  9/1978  Bradshaw et al. .................. 426/577

OTHER PUBLICATIONS

Chemical Abstracts No. 79[25]145072r, "Capsule Containing Stable Fluid", 1973, p. 218.

Primary Examiner—George Yeung

[57] ABSTRACT

A process for preparing encapsulated foods and drinks filled with a desired edible liquid is described below by conducting the following steps in order:

(a) The step of preparing a core liquid by adding calcium salt to sugar liquid and if necessary, adding other additives;

(b) The step of forming membranes of mainly calcium alginate on the surface of the core liquid by dropping the core liquid into alginic acid salt liquid and surrounding the core liquid with these membranes to form capsules;

(c) The step of exchanging the core liquid inside the capsules with water by soaking the capsules in the water;

(d) The step of exchanging the core liquid in the capsules with the desired digestible liquid by immersing the capsules in the digestible liquid.

15 Claims, No Drawings

PROCESS FOR PREPARING EDIBLE PRODUCTS IN THE FORM OF CAPSULES

BACKGROUND OF THE INVENTION (1) Field of the Invention

The present invention relates to encapsulated foods filled with a desired edible liquid and the process for preparing drinks which include such encapsulated foods. Furthermore, this invention relates to a process for preparing encapsulated foods to make, encapsulated dressings, encapsulated alcohol drinks, encapsulated coffee or red tea etc. by using dressings, fruit juice, alcoholic drinks and other liquids, popular foods, liquid sweetening materials, etc. as edible liquids and the process for preparing drinks which include these encapsulated foods.

Generally, popular foods such as alcohol, coffee, red tea, cocoa, etc. as well as fruit juice are used as drinks because of their liquid form. Moreover, acidic condiments, i.e. dressings and condiment vinegar etc., being normally liquid, are poured over a salad, for example, by using a spoon. However, the poured condiments either permeate into the salad itself or are dispersed and absorbed into any food surrounding it. Therefore, it is impossible to visually confirm the quantity that has been used or to know for certain how much of it enhanced the flavor of the salad. Although powdered condiments and granular ones may resolve these problem to a certain extent, the use of powdered ones is somewhat restricted due to their quality or taste.

The present invention intends to resolve these problem. More specifically, it provides a new process for preparing edible dressings, edible alcoholic drinks, edible coffee or tea, etc. which have the taste and quality of liquid dressings, fruit juices, alcoholic drinks, popular liquid foods, liquid sweetening materials, etc., and besides have more visual character and are not too soft.

(2) Description of Prior Preparation

Previously, a process for preparing capsules using solutions of alginic acid salt and calcium salt is conducted by dropping solutions of alginic acid salt and calcium into another solution to form a membrane of calcium alginate, thereby forming the capsule. However, it is impossible to obtain suitable capsules when this process is applied as it is to dressings, alcoholic drinks or to any preferred drinks.

For example, when an acidic condiment per se is subjected to encapsulation, the equilibrium of the alginic acid ion and sodium ion is lost by the acidifying the sodium alginate solution to agglomerate and generate alginic acid separately. Also, the calcium ions for forming the membrane are fewer because they react with acid so as to extract calcium salt by acidifying the calcium salt solution; therefore, in any way, it is difficult to produce good capsules.

It may be considered that the process is to first form the capsules and then fill them with an acidic condiment liquid. However, in this case, the capsules consisting of calcium alginate are influenced by the acid due to a time lapse, thus causing various problems to arise such as how to produce capsules with strong membranes which will neither collapse nor change in quality under preservation when filling them with the acidic condiment liquid and how to fill the acidic condiment liquid into the inner spaces of the capsules already formed.

When fruit juice per se is encapsulated as a core material, various problems arise such as that fruit juice reacts with alginic acid to increase its viscosity and alginic acid generates and agglomerates separately since fruit juice is normally an organic acid liquid of pH 3–4. Furthermore, it becomes difficult to conduct a strong bridge reaction in view of the competing COOH group of alginic acid molecules and the COOH group of fruit juice molecules because fruit juice reacts with calcium salt to decrease the number of calcium ions and further generates alginic acid calcium, producing an inferior taste so that, being not edible, this causes a problem that is difficult to solve.

Concerning alcoholic drinks to be encapsulated as core material, here also various problems arise making it difficult to form the desired capsules despite the addition of products such as xanthene gum, etc.; besides, drops of alcoholic drinks collapse on the surface of alginic acid salt liquid when they are dropped into it. The reason for such a phenomena is due to the fact that alcoholic drinks per se are low in molecular compounds and have a low viscosity. In any case, there is also the problem of solving the difficulties in forming capsules by such a reaction.

The same problem exists in the case of other liquids and liquid sweeters. Namely, when these substances are encapsulated as core material those in which the mixture of alginic acid salt with liquids or liquid sweetening material is dropped into calcium salt water solution may be encapsulated well; however, this manner of preparation is not desirable for taste because the resulting capsules become hard. Furthermore, when the mixture of calcium salt water solution and liquid sweetening material is dropped into an alginic acid water solution, an unsuitable taste is generated by the remaining calcium constituent in the sweet materials. In any case, it is difficult to prepare suitable capsules. Such problems also occur with encapsulated foods including cut solid foods containing the core liquid.

SUMMARY OF THE PRESENT INVENTION

The present invention intends to provide encapsulated foods filled with a desired edible liquid and embody a process for preparing drinks including these uncapsulated foods. The following steps in this process are, in order:

(a) The step of preparing core liquid by adding calcium salt to sugar liquid and if necessary, adding other additives.

(b) The step of forming membranes of mainly calcium alginate on the surface of the core liquid by dropping the core liquid into alginic acid salt liquid and thereby surrounding the core liquid with membranes to former capsules;

(c) The step of exchanging the core liquid inside the capsules with water by soaking the capsules in water;

(d) The step of exchanging the water-filled core liquid by immersing the granules into the edible liquid.

Further, the present invention provides a process for preparing encapsulated foods for various uses by using the following ones as edible liquids. For example, this invention provides a process for preparing encapsulated dressing using an acidic condiment liquid such as a dressing for the edible liquid; the process for preparing encapsulated fruit juice by using the fruit juice or fat-soluble coloring matter dispersing liquid as the edible liquid; the process for preparing encapsulated alcoholic drinks by using alcoholic drinks as the edible liquid; the process for preparing encapsulated liquid sweetening materials by using them as the edible liquid; and the process for preparing encapsulated edible liquid as well as minutesized solid foods by including these foods in the core liquid. Also, the present invention provides a process for preparing colored capsules by the addition of a coloring agent to the above process.

DETAILED DESCRIPTION OF THE INVENTION

The present invention comprises applying the process of forming membranes or capsules according to the reaction of alginic acid salt water solution and calcium salt water solution which form membranes by using core liquid and then expelling the core liquid to exchange it for the desired edible liquid by soaking the capsule containing the core liquid in water after forming such capsules.

Inventors gained a great deal of knowledge by studying the problems mentioned above in the prior process for forming capsules by using alginic acid salt water solution and calcium salt water solution. Namely, the bridge reaction of generating calcium alginate forms the membranes of calcium alginate by being solidly bridged between COOH groups of alginic acid molecules with calcium ions; however, the membranes are only formed with a crude net structure, so that, when the core materials are liquid, they are easily exchanged with the liquid outside of the membranes; and when capsules are made with the core liquid which applies calcium salt to small molecular materials, it is easy to expel the core liquid. Furthermore, it is preferable to form the membranes and to expel the core liquid as fast as possible in order to prepare tasty and edible capsules.

As the result of the knowledge gained as mentioned above, this invention has succeeded in preparing suitable capsules by first providing the core liquid which forms the capsules, and then exchanging it with the desired edible liquid.

In this invention, the capsules of calcium alginate are formed by dropping calcium salt water solution into sodium alginate water solution. The use of a calcium salt such as calcium chloride is allowed as a food stuff additive. The concentration of calcium is regulated from above 0.5 weight %, to normally about 1 weight %. Also, the concentration of calcium alginate is regulated to about 0.3-1 weight %. The forming reaction of calcium alginate capsules may be proceeded with the known art such as the invention of U.S. Pat. No. 3,922,360 (Japanese Laid Open to Public No 34054/80). Therefore a detailed description is abbreviated here. However, the process is conducted by dropping calcium salt water solution into sodium alginate water solution one after another, thus forming capsules of about 2-6 m/m in diameter separately to avoid adhesion. The dropping point of the calcium salt water solution, the caliber of the nozzle, and the concentration of both liquids are properly regulated.

Thus, the capsules of calcium alginate formed as mentioned above must have stronger membranes than others because they are filled with liquid. Therefore it is necessary to immerse the drops of calcium salt water solution in alginic acid water solution for a rather long time—preferably 30-240 seconds—in order to promote a reaction. In the present invention, to properly accomplish the needed reaction, the specific gravity of calcium salt water solution is regulated so as to be far greater than that of the sodium alginate water solution. Selected sugar products as cane sugar, grape sugar, fruit sugar, etc. are added to the calcium salt water solution in the proportion of 20-50 weight %, preferably about 30 weight %. The reason that selected sugar is used as a specific gravity regulating agent is due to the fact that sugar is easy to remove by soaking it in water and no matter how small a quantity might remain in the calcium salt water solution, it does not change the taste of the edible liquid with which it is filled thereafter.

Therefore, in the present invention, the membranes are formed by calcium alginate and the capsules filled with fluid solutions of calcium chloride and sugar are formed under the condition of neither floating nor sinking.

Moreover, it is possible to add gums such as xanthene, guar, tragacanth etc. together with the sugar to regulate the specific gravity of the calcium salt water solution. The gum continues to be confined in the capsules even when the granules are soaked in water as in the following step; therefore, it serves as a viscosity regulating agent of the core liquid by having been previously added it to the calcium salt solution.

The capsules are taken out from the alginic acid salt water solution as fast as possible and washed with water. Then they are soaked in water to exchange the core liquid in the small capsules with the water premeating through the structure's membranes of calcium alginate. If the capsules are left without washing with water, they adhere to each other and their membranes grow thick in an outside direction by the reaction of unreacted alginic acid and calcium. This is why it is necessary to conduct the shower washing as fast as possible to cause a portion of the core liquid to flow out with this washing. Also, the main object of soaking the capsules in water is to expel the excess calcium in the core liquid which is necessary for capsules-forming reaction. However, the soaking has another object: that of preventing the transformation of capsules after finishing the preparation by shrinking the membranes. Although the time required for soaking them in water is a little different depending upon the thickness of the membranes, about 1-2 hours are enough for removing the calcium and the sugar and to obtain the water-filled capsules of calcium alginate material.

Then, the obtained capsules mentioned above are further immersed in a desired edible liquid. In this case, the water inside the capsules is exchanged with the edible liquid during a period of about 2 hours, thus filling them with the edible liquid.

When edible liquid is an acidic condiment liquid such as a dressing, condiment vinegar, fruit juice, jam, etc., it is preferable to add a small quantity of calcium salt such as calcium chloride, calcium lactate etc., to the acidic condiment liquid. By adding such an adjusted acidic condiment liquid, the calcium alginate membranes of the capsules are prevented from the softening and damage that would occur if the capsules had been immersed in an acidic condiment liquid; therefore, it is possible to preserve the stability of the capsules containing acidic condiment liquid without changing its basic composition. The exchange of the acidic condiment liquid with water is smoothly promoted. The added quantity of calcium salt may be 0.01-0.10 weight %, preferably 0.03-0.08 weight % depending upon the quantity of the acidic condiment liquid. When the added quantity of calcium salt is less than 0.01 weight %, the membranes of calcium alginate are attacked by the acidic condiment liquid which may soften and damage the membranes, since the calcium salt cannot serve fully. On the other hand, when the added quantity of calcium salt is more than 0.10 weight %, the resulting acidic condiment material presents a bitter taste.

When coffee, cocoa etc. are used for the edible liquid, it is possible to eat them as they are with a spoon or to use them as decorative materials on cakes, puddings, etc. Thus, prepared encapsulated foods are put in a vessel as they are and if necessary, subjected to sterilization by heat for preservation.

In the above-mentioned process, it is possible to color capsules to one's preference. In this case, the coloring matter may be added as desired to either the core liquid or to the alginic acid salt liquid. When encapsulated foods according to this invention are colored, it is possible to prepare beautiful food. It is also possible to use more than two colors in preparing the capsules, which formerly could not be done. For example, a condiment prepared with both red and white capsules is beautiful when it is arranged in a dish and it is suitable to use for celebrating a happy event.

Furthermore, it is possible to eat encapsulated foods which have been immersed in an edible liquid. For example, those using an acidic condiment liquid such as a salad dressing or using a favored drink such as fruit juice, coffee, cocoa, tea, etc. for the core liquid may exchange the water inside the capsules for the desired edible liquid during preservation and provide the same when encapsulated in food the above-mentioned capsules when they are first soaked in the water; the capsules are preserved by keeping them immersed in the edible liquid and used together with it, if necessary. It is possible to sprinkle the capsules on vegetables, etc. together with edible liquid dressing and it is also possible to use the capsules as drinks when the edible liquid is a flavored drink such as fruit juice, etc.

Moreover, while capsules which are already immersed in an edible liquid may be used by exchanging the water inside them for the desired edible liquid this procedure may be followed again by immersing the granules over again in the same liquid or in any other edible liquid.

Although the capsules for fruit juice are filled with edible liquid or water, they are only in a condition of temporary enclosure and therefore the edible liquid or water is apt to ooze out. It is possible to prevent this oozing when a little of the same kind (same taste) or different kind (different taste) of edible liquid is added to these granules so that they are preserved in a state of aggregation by immersing them in added edible liquid. However, it may not be necessary to prevent oozing when the capsules are used as dressings or drinks. It may be preferable to soften the membranes to improve their taste; hardened ones may generate a less pleasant taste. However, if desired, the oozing can be prevented by the prior addition of a thermosetting substance into the core liquid or alginic acid salt liquid.

To accomplish this, the procedure is to first add a small quantity—preferably 0.05–1 weight % as solid—of thermosetting material such as glair, (raw egg white) lactalbumin, serum albumin, etc. to the alginic acid salt liquid. It is possible to regulate the extent of preventing the leak of the containing substance by properly increasing or decreasing the added quantity. The added thermosetting material only adheres to the surroundings of meshes of calcium alginate or is contained in a mesh structure and does not influence the exchange of contained substance at all; therefore, after forming membranes, the granules should be quickly washed with water, then soaked in water so as to exchange the contained substance with water. In this step, the sugar liquid including unreacted calcium salt is completely exchanged with the water. It is easy to judge whether the exchange is done completely or not because sugar liquid has been used as the first core liquid. The soaking time in water is different with the kind of final product; however, it is generally complete after 30 minutes to several hours.

Thus, the resulting capsules containing water are immersed in the proposed edible liquid in order to conduct the exchanging procedure once again. This exchanging procedure is also conducted for 30 minutes to several hours. The leaking of the contained liquid is decreased or prevented by heating whole edible liquid by immersing capsules in the edible liquid at the same time and when the exchanging procedure is almost finished, since thermosetting material adhered to or contained in the surroundings of the meshes of the capsule membranes gradually begins to coagulate, then causes the membranes to fill up the meshes therein. In this case, it is preferable to use glair (raw egg white) to prevent almost completely leakage of the contained liquid and the shrinkage of capsules because the glair is tasteless and therefore makes strong membranes without changing the taste of dressings, wine, etc. Needless to say, the heating may be done after the exchanging step.

According to the above-mentioned process, it is possible to harden membranes, in spite of its being troublesome, with the contained substance-exchanging process in a very simple way. Besides, it is possible to preserve the contained substance as a liquid, so this process may be used for preserving not only encapsulating foods but also medicines, chemicals, etc. without causing damage to their characteristics by encapsulating them.

Moreover, the new process also applies to the encapsulating of foods in small pieces such as cut pickled vegetables, foods boiled in soy sauce, or cut seaweed together with the desired edible liquid inside them.

As described above, the new process is suitable to prepare edible dressings, edible fruit juice, edible coffee, cocoa or red tea, etc. by using any acidic condiment liquid such a dressing, fruit juice, fat-soluble coloring matter dispersing liquid, alcoholic drinks, flavored liquids, or liquid sweetening material, etc. Various examples for using the above-mentioned liquids follow:

EXAMPLE 1

(A case using acidic condiment liquid)

A calcium chloride water solution containing 0.5 weight % of calcium, 0.3 weight % of xanthene gum, 20 weight % of edible oil, 30 weight % of cane sugar was stirred in order to emulsify it. The emulsion was dropped into 0.5 weight % sodium alginate water solution to obtain drops about 5 m/m in diameter through a nozzle at the speed of 100 drops per minute. In this way the drops were floated on the water solution for about 120 seconds, then were formed one after another into capsules of calcium alginate of 4–6 m/m in diameter. The sodium alginate water solution was stirred slowly during the emulsion's dropping. The resulting capsules were gathered and soaked in water for 2 hours, then taken out after confirming the removal of sugar and immersed into a previously prepared french dressing liquid in which about 0.05 weight % of calcium chloride was added so as not to change the taste. After two hours, the water inside the capsules was confirmed to be thoroughly exchanged with the dressing liquid and then the capsules were taken out and gathered to be put into a vessel. After from 24 hours to a week, the capsules were reexamined and their shapes and taste were found to be exactly the same as they were right after being put into the vessel.

EXAMPLE 2

(A case using fruit juice or fat-soluble coloring matter dispersing liquid)

(a) The pulp of apples (pH 3.8), the mixed juice of vegetable (pH 4.2) consisting of celery, tomatoes and lettuce and the pulp of oranges (pH 3.6) were provided, then sodium bicarbonate was added in order to regulate adjust to pH 5.5, pH 6.0 and pH 7.0, respectively.

(b) 0.7 weight % of calcium chloride (calculated with anhydrous salt) and 0.6 weight % of xanthene gum were added to them and grape sugar was added in order to prepare the core liquid of 1.05 at specific gravity (about 15 weight % at sugar concentration).

(c) The core liquid was dropped into 7 weight % sodium alginate solution little by little and was moved to downflow for about 120 seconds by sinking it; at the end of the flow capsules were gathered in a net and showered with water.

(d) The showered capsules were quickly put into a water-filled bath and soaked for 2-3 hours by changing the water every 30 minutes; then the capsules filled with water were produced as desired.

(e) The resulting juice "orange pulp" capsules were added to orange juice at the rate of 10 weight % and made into capsules containing orange juice for preparing an orange juice drink.

Also, the resulting "apple pulp" capsules were made for use as dessert material by putting them into a bottle after adding a small quantity of apple juice.

The resulting capsules of "mixed vegetables" were subjected to preparation as a variety of the orange juice drink by adding them to natural orange juice at the rate of 20 weight %.

EXAMPLE 3

(A case of preparing jam-like granules)

(a) Grape juice (pH 2.8), the mixed juice of vegetables (pH 4.2) of celery, tomatoes and carrots and the pulp of fresh oranges (pH 3.6) were provided; then sodium bicarbonate was added in order to adjust to pH 5.5, pH 6.0 and pH 6.5 respectively.

(b) 0.7 weight % of calcium chloride (calculated with anhydrous salt) and 0.6 weight % of xanthene gum as well as grape sugar were added in order to prepare a core liquid of 1.05 at specific gravity (about 15 weight % at sugar concentration).

(c) The core liquid was dropped into 0.7 weight % sodium alginate solution little by little and moved to downflow for about 120 seconds by sinking it and at the end of the flow the capsules were gathered in a net and showered with water.

(d) The showered capsules were quickly put into a filled water bath and soaked for 2-3 hours changing the water every 30 minutes; thus water-filled capsules were produced.

(e) Using 3 kinds of capsules; the ones used for grape juice were immersed in natural grape juice (60 weight % at cane sugar concentration and 0.03 weight % at calcium chloride concentration) of the same weight were added to the capsules; the ones used for mixed vegetable juice were immersed in carrot juice (60 weight % at cane sugar concentration and 0.01 weight % at calcium chloride concentration) of the same weight and were added to the capsules; and the ones that used the pulp of oranges were immersed in the orange juice (58 weight % at cane sugar concentration and 0.02 weight % at calcium chloride concentration) of the same weight and added to the capsules; and after boiling them for about two hours were put into a vacuum pan. Thus 3 kinds of jam-like capsules of about 65 weight % at sugar concentration were produced.

EXAMPLE 4

(A case of producing alcoholic drinks)

(a) Core liquid (15 weight % at sugar concentration and 1.05 at specific gravity) was made by preparing 33 weight % grape sugar water solution containing 0.7 weight % of calcium chloride (calculated with anhydrous salt) and 0.6 weight % of xanthene gum.

(b) The core liquid was dropped into 0.8 weight % sodium alginate solution little by little and moved to downflow for about 130 seconds by sinking it; at the end of the flow, the capsules were gathered in a net and showered with water.

(c) The showered capsules were quickly put into the filled water bath and soaked in it for 2-3 hours; thereby, capsules for alcoholic drinks filled with water were produced.

(d) The resulting capsules for alcoholic drinks were added to wine of 15 weight % at alcohol concentration at the rate of 10 weight % in order to produce the wine drink.

EXAMPLE 5

(A case using any desired liquid material)

(a) Core liquid (15 weight % at sugar concentration and 1.05 at specific gravity) was made by preparing 15 weight % grape sugar water solution containing 0.7 weight % of calcium chloride (calculated with anhydrous salt) and 0.6 weight % of xanthene gum.

(b) The core liquid was dropped into 0.8 weight % sodium alginate solution little by little and moved to downflow for about 130 seconds by sinking it; at the end of the flow, capsules (6 mm in average diameter) were gathered in a net and showered with water. (c) The showered capsules were quickly put into the filled water bath and soaked in it for 2-3 hours; thereby, the capsules filled with water were produced.

(d) The resulting capsules were immersed in coffee extraction liquid for 2 hours, thereby, encapsulated coffee was produced.

(e) The resulting encapsulated coffee was gathered into a vessel and preserved after sterilizating it with heat.

(f) About 30 capsules of the encapsulated coffee were added to a cup of hot water, thereby, the desired coffee drink was produced.

(g) About 30 capsules of encapsulated coffee were added to a cup of milk; thereby, the desired milk coffee was produced.

EXAMPLE 6

(A case using liquid sweetening material)

(a) Core liquid (15 weight % at sugar concentration and 1.05 at specific gravity) was made by preparing 15 weight % grape sugar water solution containing 0.7 weight % of calcium chloride (calculated with anhydrous salt) and 0.6 weight % of xanthene gum.

(b) The core liquid was dropped into 0.8 weight % sodium alginate solution little by little and moved to downflow for about 130 seconds by sinking it and at the end of the flow, capsules (6 mm in average diameter) were gathered in a net and showered with water.

(c) The showered capsules were quickly put into a filled water bath and soaked for 2–3 hours; thereby, water-filled capsules were produced.

(d) The resulting capsules were immersed in cane sugar liquid (55 weight % at concentration) for 2 hours, thereby providing an encapsulated sweetening material.

(e) The capsules were was gathered into a vessel and preserved after sterilization by heat.

(f) To prepare a low calorie sweetener, the capsules in step (c) were immersed in liquid artificial sweetening material [α-glycosylstevioside (1 weight % at concentration) and maltitol (50 weight % at concentration)] for 2 hours; thereby a low calorie encapsulated sweetening materialwas produced.

(g) The resulting capsules were was preserved after sterilization as in step (e).

EXAMPLE 7

(A case using cut solid foods)

(a) 500 g of cut salted vegetables such as seeds of beefsteak plant, ginger, radishes or their mixture were subject to "de-salting" by soaking them in water for an hour; when swollen they were squeezed in order to expel the water.

(b) 500 g of calcium chloride water solution containing 2 weight % of calcium, 1 weight % of xanthene gum and 20 weight % of glucose were provided.

(c) The vegetables provided as in step (a) and the calcium chloride water solution provided in step (b) were mixed so as to form each capsules to the size of a salted plum. Then, the mixtures were immersed one after another in 1 weight % of alginic acid water solution.

(d) By leaving the mixtures immersed in the solution for 10 minutes, calcium alginate membranes were formed individually on the surface of the vegetables.

(e) The membrane-formed vegetables were gathered and soaked in water for 12 hours. After confirming the removal of sugar (glucose), the vegetables were taken from the water and immersed in condiment liquid (soy sauce) which had previously been prepared. After about 24 hours, the de-salted cut vegetables were taken out of the condiment liquid and put into a vessel after confirming that they were thoroughly tasty and after the water was thoroughly exchanged with the condiment liquid.

After leaving them in a refrigerator for a month, the shapes of the membrane-formed vegetables in the vessel were the same as they had been just after they were first put into the vessels: they had not changed the taste nor the flavor and therefore it was possible to eat them as sliced vegetables preserved in soy sauce.

What we claim is:

1. A process for preparing edible products in the form of capsules filled with an edible liquid by conducting the following steps:

a. preparing core liquid by adding calcium salt to sugar liquid;
    b. forming membranes of mainly calcium alginate on the surface of the core liquid by dropping the core liquid into alginic acid salt liquid and thereby surrounding the core liquid with these membranes to form capsules;
    c. exchanging the core liquid in the capsules with water by soaking the capsules of the core liquid in water to remove therefrom any unreacted calcium salt;
    d. exchanging the core liquid in the capsules with an edible liquid by immersing the water-filled capsules in the edible liquid.

2. A process as claimed in claim 1, wherein said edible liquid contains a slight quantity of calcium salt when the edible liquid is an acidic one.

3. A process as claimed in claim 1 or claim 2, wherein the concentration of the calcium salt in said edible liquid is 0.01–0.1 weight %.

4. A process as claimed in claim 1, wherein said core liquid includes gum as a viscosity regulating agent and the specific gravity of the liquid is larger than 1.

5. A process as claimed in claim 3, wherein said edible liquid is an acidic condiment liquid containing 10–40 weight % of edible oil and is emulsified.

6. A process as claimed in claim 1 or claim 4, wherein said edible liquid is fruit juice.

7. A process as claimed in claim 6, wherein said core liquid contains pectin and the fruit juice is of high concentration; and the core liquid is heated during its immersion in the edible liquid, thereby to produce jam-like filled capsules.

8. A process as claimed in claim 1 or claim 4, wherein said edible liquid includes an alcoholic beverage.

9. A process as claimed in claim 1 or claim 4, wherein said edible liquid is selected from the group consisting of coffee, cocoa and tea.

10. A process as claimed in claim 1 or claim 4, wherein said edible liquid is liquid sweetening material selected from the group consisting of sugar liquid and artificial sweetening material water solution.

11. A process as claimed in claim 1 or claim 4, wherein said core liquid contains food which has been cut into small pieces or otherwise reduced in size, boiled down in soy sauce and said edible liquid is a condiment liquid, thereby producing capsules containing small pieces of food preserved in said condiment.

12. A process as claimed in claim 1 or claim 4, wherein said core liquid contains a thermosetting substance and any leakage of said edible liquid from inside of the capsules is prevented by heating during immersion of the granules in the edible liquid.

13. A process as claimed in claim 1 or claim 4, wherein said core liquid contains coloring matter, whereby colored capsules are produced.

14. A process as claimed in claim 1 or claim 4, wherein said alginic acid salt liquid contains a thermosetting substance and any leakage of said edible liquid from inside of the capsules is prevented by heating durinhg immersion of the granules in the edible liquid.

15. A process as claimed in claim 1 or claim 4, wherein said alginic acid salt liquid contains coloring matter, whereby colored capsules are produced.

* * * * *